United States Patent
Johnson

(10) Patent No.: US 12,326,886 B2
(45) Date of Patent: Jun. 10, 2025

(54) FACILITATING VERIFIER INTEGRATIONS IN INTERPRETING UNKNOWN SCHEMAS

(71) Applicant: American Express Travel Related Services Company, Inc., New York, NY (US)

(72) Inventor: Steven Todd Johnson, Tempe, AZ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 0 days.

(21) Appl. No.: 18/362,339

(22) Filed: Jul. 31, 2023

(65) Prior Publication Data
US 2025/0045311 A1   Feb. 6, 2025

(51) Int. Cl.
*G06F 16/3332* (2025.01)
*G06F 40/205* (2020.01)

(52) U.S. Cl.
CPC ........ *G06F 16/3332* (2019.01); *G06F 40/205* (2020.01)

(58) Field of Classification Search
CPC ............................ G06F 16/3332; G06F 40/205
See application file for complete search history.

(56) References Cited

U.S. PATENT DOCUMENTS

| | | | |
|---|---|---|---|
| 2011/0153590 A1* | 6/2011 | Chang | G06F 16/958 707/711 |
| 2021/0067340 A1* | 3/2021 | Ferenczi | H04L 9/50 |
| 2022/0277019 A1* | 9/2022 | Mitelman | G06F 16/24535 |
| 2022/0335046 A1* | 10/2022 | Oshio | G06F 16/93 |
| 2023/0139783 A1* | 5/2023 | Garib | G06N 3/044 707/769 |
| 2023/0325424 A1* | 10/2023 | Kieser | G06F 3/04847 |

* cited by examiner

*Primary Examiner* — Cam Y T Truong
(74) *Attorney, Agent, or Firm* — Thomas Horstemeyer, LLP

(57) ABSTRACT

Disclosed are various approaches for facilitating verifier integrations using computer models. An exemplary system of the present disclosure comprises a computing device comprising a processor and a memory; and machine-readable instructions stored in the memory that, when executed by the processor, cause the computing device to at least: receive an unstructured claim query for a data document from an entity computing device, wherein the data document is structured in accordance with a data document schema; parse the unstructured claim query to identify attributes that are then converted to a machine-understandable representation of the unstructured claim query; prepare, using a predictive model that is trained to understand data documents that are structured in accordance with the data document schema, a query response to the machine-understandable representation of the unstructured claim query by evaluating contents of the data document; and transmit the query response to the entity computing device.

19 Claims, 5 Drawing Sheets

FACILITATING VERIFIER INTEGRATIONS IN INTERPRETING UNKNOWN SCHEMAS

BACKGROUND

Users often are required to verify characteristics about themselves when requesting services. For example, a user may need to verify characteristics about their identity, such as their age or qualifications, when requesting services from an organization. To do so, a user can be issued an identity credential that contains information about the person. However, in order to validate the authenticity of the credential, a verifier would need to have an understanding of the credential format, including its syntax and object properties. Without such knowledge, verification of the credential is problematic.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for facilitating verifier integrations using computer models to interpret unknown credential schemas of identity credentials. Accordingly, methods and systems of the present disclosure enable an identity credential (e.g., a verifiable credential) that contains a claim in regard to a person or entity to be verified by a "verifier" entity that does not have pre-existing knowledge concerning the semantics (what fields or attributes mean, how to interpret content, etc.), syntax (the type, length, form, presence/absence of key/value pairs of data objects, etc.), object properties, etc. of the credential, while allowing the verifier to verify the data contained in the credential. In other contexts, methods and systems of the present disclosure also enable a person, entity, software application, etc. to submit claim requests or queries for a variety of types of service or application interfaces that are unknown to the requestor, such as application programming interfaces (APIs) or web services, which could made at runtime in the context of a requesting application. One example of a service or application interface could relate to an electronic commerce application that allows a user to purchaser goods or services with his or her user device 101. Another example of a service 500 could be a financial service application such as banking or brokerage application that allows a user to perform financial transactions.

Correspondingly, in the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1:
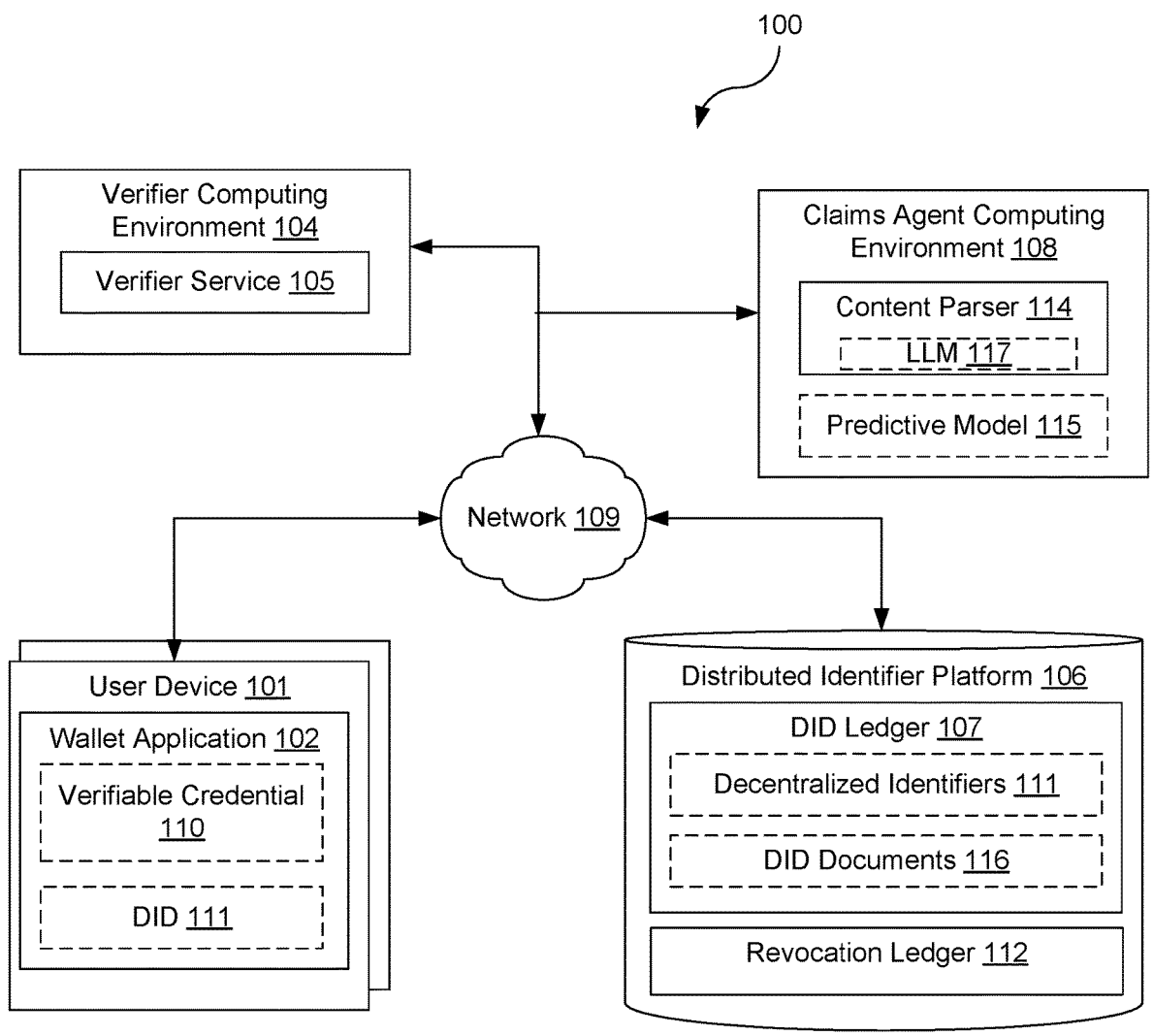
FIG. 1 gives an overview of an exemplary embodiment of a verifier interpretation system of the present disclosure.

FIG. 1 gives an overview of an exemplary embodiment of a verifier interpretation system 100 of the present disclosure. One exemplary embodiment of the system 100 comprises a user device 101 (e.g., a mobile smartphone, tablet, etc. having a digital wallet application 102), a verifier computing environment 104 (e.g., server computer platform), a distributed identifier (DID) ledger platform 106 (e.g., a blockchain or distributed ledger network) having one or more distributed identifier ledgers 107, a claims agent computing environment 108, and a computer network 109. Accordingly, a user can have a user device (e.g., mobile smart phone) with a digital wallet application 102 that interacts with the verifier computing environment 104, distributed identifier platform or network 106, and/or claims agent computing environment 108 over the computer network 109. As such, the user may have a decentralized identifier (DID) 111 on a decentralized identity (DID) ledger 107 of the verifier interpretation system 100, which can be used to create verifiable credentials (VCs) 110 by one or more trusted issuer computing devices (not shown).

In various embodiments, the distributed ledger platform 106 represents synchronized, eventually consistent, data stores or databases spread across multiple nodes in different geographic or network locations. Each node in the distributed ledger platform 106 can contain a replicated copy of the distributed identifier ledger 107, including all data stored in the distributed identifier ledger 107. Records of transactions involving the distributed identifier ledger 107 can be shared or replicated using a peer-to-peer network connecting the individual nodes that form the distributed ledger platform 106. Once a transaction or record is recorded in the distributed identifier ledger 107, it can be replicated across the peer-to-peer network until the record is eventually recorded with all nodes. Various consensus methods can be used to ensure that data is written reliably to the distributed identifier ledger 107. In some implementations, data, once written to the distributed identifier ledger 107, is immutable. Examples of a distributed data store that can be used for the distributed ledger platform 106 can include various types of blockchains, distributed hash tables (DHTs), and similar data structures. Various data can be stored in the distributed identifier ledger 107. For example, the distributed identifier ledger 107 can include DIDs 111 associated with respective users.

As such, in various embodiments, the verifier interpretation system 100 of the present disclosure leverages blockchain and/or distributed ledger technology and utilizes decentralized identifiers (DIDs) for users (entities) of the system. A benefit of the decentralized identity model over centralized and federated models is that the user remains in complete control of identity, including being able to prove some characteristic (e.g., the age of the user), without actually disclosing actual personal data (i.e., birthdate). However, by having a decentralized system, different entities can create different verifiable credential formats and structures that may not be easily understood by verifiers that are tasked to verify the data contained in verifiable credentials 110. Similarly to credential schemas, other schema rules may also be unknown to requesting users, such as schemas for APIs, web service messages, databases, etc.

In contrast with conventional identification systems, systems and methods of the present disclosure enable a verifier to verify credential data using the claims agent computing environment 108, where the claims agent computing environment 108 is trained to be familiar with the structure of a credential schema. In alternative embodiments, the claims agent computing environment 108 can be trained to be familiar with the structure of other data documents and messages, such as the schemas of APIs and web service messages. As such, a schema generally defines the data elements and objects that can appear in a data document or message and provides rules for how this data is structured in the particular data document or message. Accordingly, in such embodiments, a requesting user/entity can use the claims agent computing environment 108 to verify information with respect to data object structures that the requestor is unfamiliar with how to interact.

In accordance with embodiments of the present disclosure, a decentralized identity (DID) 111 is created by a user or entity and is provided to a service where the user chooses to interact. In various embodiments, a decentralized identifier (DID) 111 comprises a globally unique identifier (e.g., as defined by the W3C DID specification), which is associated with or points to a DID document in the form did: <DID method>: <method-specific identifier>. The DID method is a reference to a specific distributed ledger or network or database and the method-specific identifier allows to resolve the DID within that reference. Given a DID, one can retrieve the referenced DID document 116, such as one would do with an URL to locate (e.g., a web resource). A DID document describes public keys, service endpoints, and other metadata associated with a DID 111.

Referring back to FIG. 1, a user may store one or more verifiable credentials 110 in the user's digital wallet 102, where the verifiable credential 110 is issued by an issuer based on a decentralized identifier (DID) 111 of the user. In this context, the user can also be referred to as a verifiable credential holder, such that the user receives an issued verifiable digital credential 110. Then, the user can later share elements of the stored credentials or can create a cryptographic proof that can be used in response to a request, without revealing the underlying data.

The verifiable credentials 110 may include one or more of the following data: physical appearance, job title, name, email address, physical home address, social security number, age, birthplace, birth date, address history, employment information, employment history, college or school degree, graduation date, college or school history, utilities, financial information, home ownership, employment information, etc. This list is not exhaustive. Other data may be included with the verifiable credentials 110 that can provide and describe the identity of the user/holder.

In this illustrative case, the verifiable credential 110 is issued to the user and is stored in the user's digital wallet 102. The digital wallet 102 can create, store, negotiate, exchange, share, and/or otherwise employ many different digital identification or access control data elements. Such data elements may include decentralized identifiers (e.g., DIDs) 113, public/private keypairs, secret keys, verifiable claims, computed (cryptographic) proofs, attestations, credentials 110, access control (login) credentials, cryptographic tokens, user identifiers, etc.

In the context of FIG. 1, a verifiable credential (VC) 110 is created by a trusted issuer and sent to a receiving user or entity (e.g., user's digital wallet application 102). The VC 110 generally contains a set of claims (e.g., pieces of information) about attributes of the receiving user/entity (e.g., name, birth date, grade, ID, or other information the issuer wants to attribute to the receiving user/entity). When providing a proof of its identity or one or more identity characteristics to a verifier computing environment 104, a user can present a subset of the attribute values in a form of verifier credential referred to as a verifier presentation. Thus, the verifier presentation allows the user to present only a subset of attribute values, such as revealing the birth date attribute without the name attribute, to the verifier computing environment 104.

In FIG. 1, the user may present its verifiable credential 110 (as proof of its identity or proof of an identity characteristic) to the verifier computing environment 104. In various embodiments, the verifiable credential (VC) 110 is a form of machine-readable credential that is bound to a DID 111 in a DID document 116 and thus linked to an identity. As such, in various embodiments, the verifiable credential 110 comprises a digitally signed cryptographic set of data (claims) containing information about a person, entity, or thing (e.g., as defined by the World Wide Web Consortium (W3C) Verifiable Credentials Data Model specification).

As part of a verifier service 105 executed by the verifier computing environment 104, a proof request can originate from a verifier asking for credentials or a proof from a user or holder's wallet application 102. In its simplest form, a proof request is a request for data, but could also be a request to prove that a person has a particular identity characteristic, such as proof that the person is at least 21 years of age. Accordingly, cryptographic proof can be presented by the holder/user to the verifier in response to a proof request and is used by the verifier service 105 to check that signatures are correct. In some cases, the claim from the verifiable credential 110 can be presented in response to a proof request, and in other cases, a Zero Knowledge Proof (ZKP; e.g., zk-SNARKs) can be involved that demonstrates a claim is true, without presenting the actual data behind the proof.

After receiving cryptographic proofs or credential elements from the user/holder, the verifier computing environment 108 verifies the presented data/proof by checking a decentralized identity platform to ensure the digital signatures of the issuer and holder are valid and that the credentials have not been revoked. For example, a verifier may check a decentralized identifier (DID) ledger 107 to authenticate the issuer and holder and check a revocation ledger 112 to determine whether a verifiable credential 110 is still valid. For example, the verifier may know with certainty which issuer is attesting to the verifiable credential 110 by confirming an associated digital signature against the DID ledger 107. The DID ledger 107 may verify identifiers from the issuer, the user/holder, and verifiable credential schemas. An exemplary DID ledger 107 that may be utilized is the Sovrin blockchain ledger provided by the SOVRIN FOUNDATION. However, other blockchains or similar data structures may also be used in the various embodiments of the present disclosure.

Generally, a verifiable credential schema is a machine-readable file containing a set of attributes that can be used for the claims on a credential. Schemas can be written to the DID ledger 111 (or other blockchain ledger) by the schema author but that is not guaranteed to occur. Accordingly, by having a decentralized system, different entities can create different verifiable credential formats and structures, such as semantics (what fields or attributes mean, how to interpret content, etc.), syntax (the type, length, form, presence/absence of key/value pairs, etc. of data objects), object properties, etc., that may not be easily understood or may be unknown.

Thus, in accordance with various embodiment, the claims agent computing environment 108 uses a predictive model 115 that is trained to learn a credential schema structure for a verifiable credential or claim and can then be applied to a verifiable credential or claim on behalf of an unstructured request from a verifier directed to an inquiry regarding a credential/claim. As a general background, predictive model learning refers to inferring a model of software components. This model could be a Hidden Markov-Chain Model (HMM), for example. Both passive learning and active learning are possible. In passive learning, the training data is labeled upfront. In active learning, however, labeling is performed on the specific instances when explicit queries are submitted.

To process a received query or inquiry request regarding a credential or claim, the claims agent computer system 108 can also execute a content parser 114 comprising a large language model (LLM) 117 that is configured to parse an unstructured claim request in order to return a structured response to the requester (e.g., verifier computing environment 104, user device 101, etc.). In certain embodiments, the unstructured claims may be expressed in a natural language form.

The content parser 114 can be executed to extract, analyze and/or parse digital content into one or more terms. For example, the content parser 114 can comprise a semantic parser that is configured to convert a natural language phrase or utterance into a machine-understandable representation of its meaning. In various examples, the content being extracted and parsed by the content parser 114 can be included in a verifiable credential 110, an inquiry, a response, and/or other type of object that may include natural language content.

Thus, in an illustrative example, a verifier computing environment 104 may be asked to verify a given verifiable credential of an individual for which the verifier does not know the credential schema. In turn, the verifiable computing environment 104 transmits the unknown verifiable credential of the individual and an unstructured claim query (e.g., is the individual over the age of 18?), using natural language, to the claims agent computing environment 108. The claims agent computing environment 108 uses the large language model 117 to parse the unstructured claim and the verifiable credential to identify data attributes and uses the predictive model 115 to recognize the credential format of the verifiable credential and to interrogate the verifiable credential based on the query attributes to provide a structured response (e.g., Yes, the individual is over the age of 18). In this way, the verifier computing environment 104 can verify a credential claim without knowledge of either the structure of the verifiable credential or its contents.

For instance, in the above example, the verifier computing environment 104 does not know if the individual's age is one of the data attributes of the verifier credential or if the individual's birthdate is specified as one of the data attributes. In this arrangement, anyone could assume the role of a verifier with the aid of the claims agent computing environment 108 that has been trained to learn a particular credential schema, where the verifier can make an unstructured claim query regarding an unknown verifiable credential schema that is now understood by the claims agent computing environment 108. For example, the claims agent computing environment 108 can map the elements of the unstructured claim to the credential schema to form a structured claim query that is processed against the verifiable credential and its particular credential schema.

In another illustrative and non-limiting example, a verifier computing environment 104 may be a merchant and may have a DID 111 of a customer, where a transaction between the merchant and the customer involves a payment of a cup of coffee using reward points offered by a transaction account issuer. In this example, the transaction account issuer operates the claims agent computing environment and maintains credential information on the reward points in current possession of the customer, who is also a customer of the transaction account issuer. Thus, the merchant may want to receive verification that the customer has sufficient rewards points to pay for the cup of coffee before accepting the reward points as payment. Accordingly, the verifier computing environment 104 (of the merchant) can submit an unstructured query to the claims agent computing environment that asks if the customer has enough reward points to cover the price of the cup of coffee. The claims agent computing environment 108 may then use the large language model 117 to parse the unstructured query and use the predictive model 115 (that has been trained to recognize the credential format) to interrogate the customer's credential information to provide a structured response (e.g., Yes, the customer has sufficient reward points to pay for the cup of coffee). In this way, the verifier computing environment 104 can verify a credential claim without knowledge of either the structure of the verifiable credential or its contents. In various embodiments, feedback data can be requested from the requestor by the claims agent computing environment regarding the effectiveness or appropriateness of the structured response, such that the feedback data can be used to further train the large language model 117 to improve its performance in preparing appropriate responses.

In certain embodiments, before responding to a query from the verifier computing environment 104, the claims agent computer system may request for proof that the verifier computing environment 104 is trusted, such as by providing credentials showing that the verifier computing environment 104 has pre-registered with or has been certified by the claims agent computing environment (or some other trusted entity) or has provided some other form of authentication. In various embodiments, requests for certain levels of personal information may also require approval from a subject of the request before certain information is released to the requestor. In this way, personal and private information of customers is not generally released to third-party requestors unless appropriate authentication is provided by a requestor and/or appropriate authorization is provided by a subject/customer.

Figure 2:
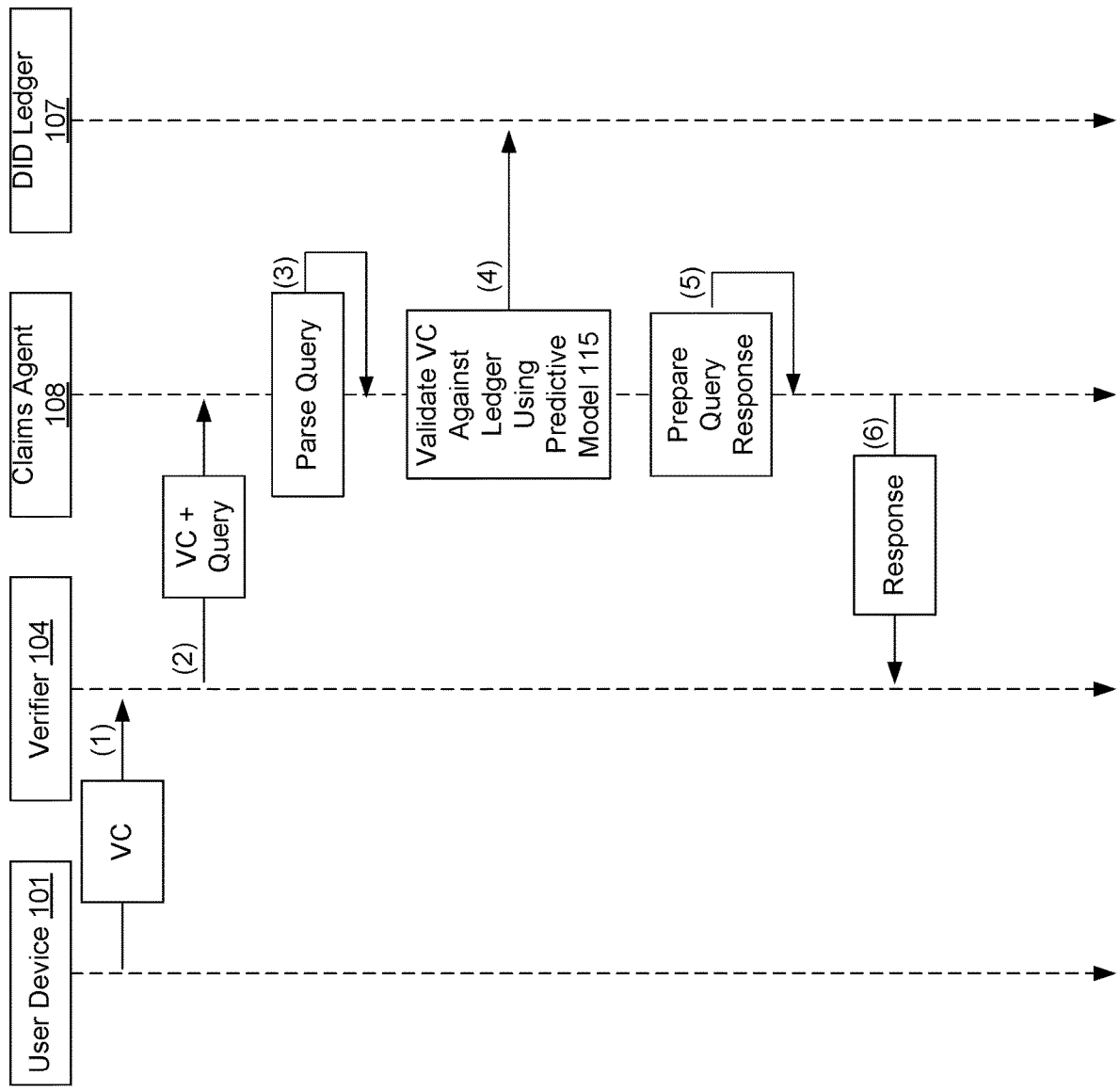
FIGS. 2-4 are sequence diagrams illustrating examples of functionality in the verifier interpretation system of FIG. 1 according to various embodiments of the present disclosure.

Referring now to FIG. 2, a flow or sequence diagram is provided that illustrates an execution of a process for interpreting unknown credential schemas of identity credentials within a verifier interpretation system 100. As shown in sequence 1 of the diagram, a user device 101 (associated with a user/holder) supplies a verifier computing environment 104 with a verifiable credential (VC) 110 that is unknown to the verifier computing environment 104. In this example, the user is providing the verifiable credential 110 to the verifier computing environment 104 as proof that the user/holder of the credential is over the age of 18. The communications between the verifier computing environment 104 and the user device 101 (e.g., via wallet application 102) may be made using a trusted messaging protocol, such as DIDComm.

In various embodiments, the verifiable credential (VC) 110 is a form of machine-readable credential that is bound to a DID 111 in a DID document 116 and thus linked to an identity. As such, in various embodiments, the verifiable credential 110 comprises a digitally signed cryptographic set of data (claims) containing information about a person, entity, or thing (e.g., as defined by the World Wide Web Consortium (W3C) Verifiable Credentials Data Model specification). However, in order to validate the authenticity of the credential, the verifier would need to have an understanding of the credential format, including its syntax and object properties. Without such knowledge, verification of the credential is problematic.

In this illustrative and non-limiting example, the verifier computing environment 104 does not have knowledge of the semantics or syntax or schema of the verified credential 110 of the user. As a result, the verifier computer device 104 passes the verifiable credential to the claims agent computing environment 108 with a query (e.g., an unstructured query), as represented in sequence 2. In an illustrative example, the query may be asking if the holder/user of the verifiable credential is over the age of 18. The communications between the verifier computing environment 104 and the claims agent computing environment 108 may be made using a trusted messaging protocol, such as DIDComm.

In response to receiving the query and credential, the claims agent computing environment 108 performs large language model parsing on the query to identify attributes that can be converted into a machine-understandable representation of its meaning, as shown in sequence 3. For example, to process a received query or inquiry request regarding a credential or claim, the claims agent computer system 108 can execute a content parser 114 (FIG. 1) comprising a large language model (LLM) 117 that is configured to parse an unstructured claim request in order to return a structured response to the requester (e.g., verifier computing environment 104, user device 101, etc.). In certain embodiments, the unstructured claims may be expressed in a natural language form. The content parser 114 can be executed to extract, analyze and/or parse digital content into one or more terms. For example, the content parser 114 can comprise a semantic parser that is configured to convert a natural language phrase or utterance into a machine-understandable representation of its meaning.

Next, in order to respond to the claim query from the verifier computer device 104 and authenticate that the verifiable credential (VC) 110, the claims agent computing environment 108 consults one or more distributed ledgers, such as DID ledger 107, to ensure the digital signatures of the issuer and holder are valid within the verified credential and/or that the credential has not been revoked, where format and placement of the signatures and network location of the appropriate distributed ledgers are known to the claims agent computer system from its predictive model 115 and prior training with similarly structured verifiable credentials and/or claims, as represented in sequence 4.

After verifying the applicable contents of the verifiable credential, the claims agent computing environment 108 can then determine the appropriate response to the claim query by analyzing and evaluating the credential structure and contents, as shown in sequence 5. In various embodiments, the claims agent computing environment 108 can use its predictive model 115 to recognize the credential format of the verifiable credential and to interrogate the verifiable credential based on the query attributes to provide a structured response (e.g., Yes, the individual is over the age of 18).

Then, in sequence 6, the claims agent computing environment 108 can provide and send a verification response to the verifier computing environment (e.g., Yes, the holder of the verifiable credential is over the age of 18), as represented in sequence 6. The communications between the verifier computing environment 104 and the user device 101 (e.g., via wallet application 102) may be made using a trusted messaging protocol, such as DIDComm.

Figure 3:
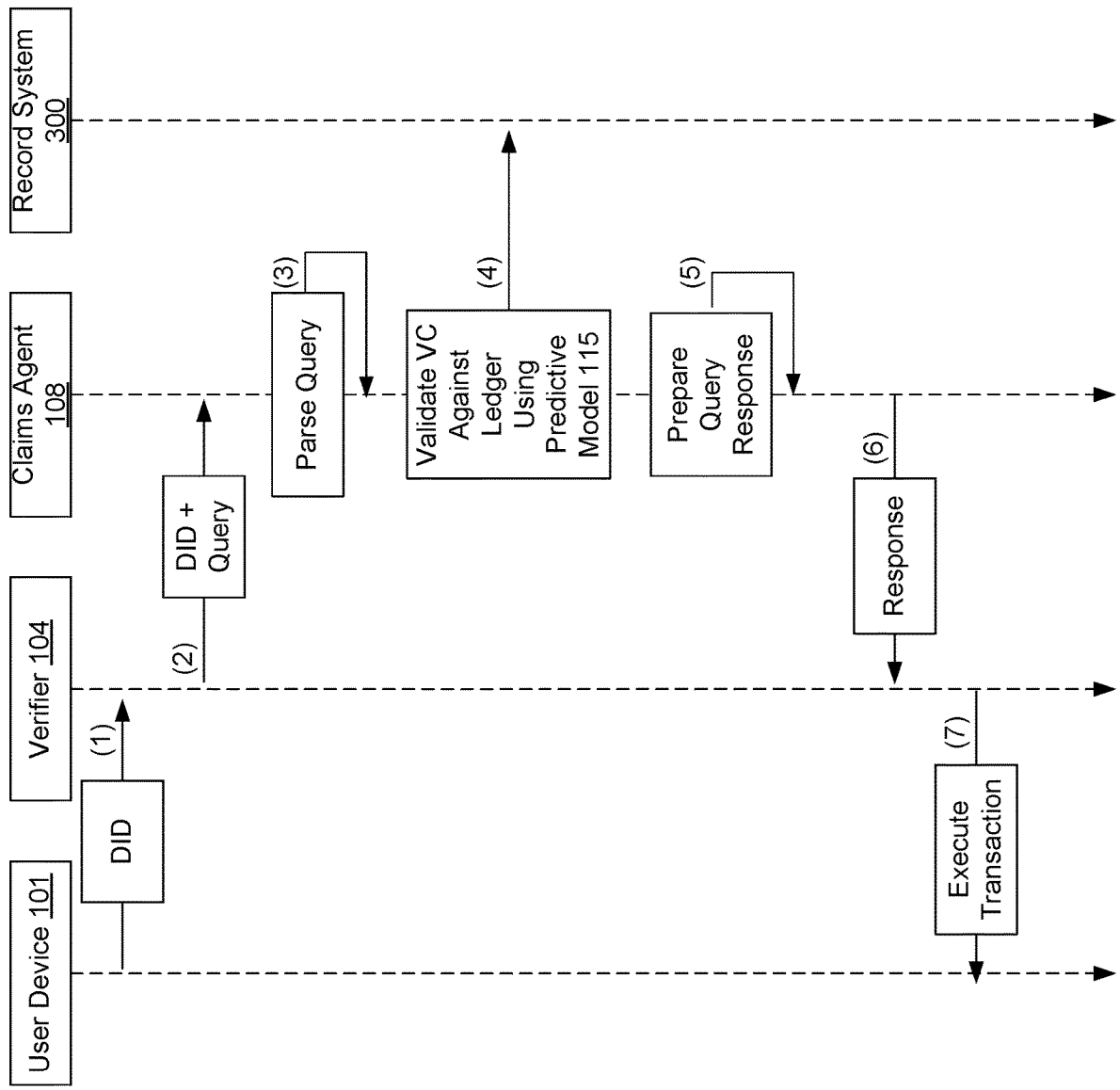

Next, in FIG. 3, a flow or sequence diagram is provided that illustrates an execution of a process for interpreting unknown schemas within a verifier interpretation system 100. As shown in sequence 1 of the diagram, a user device 101 (associated with a customer/holder) supplies a verifier computing environment 104 (e.g., associated with a merchant in this illustrative and non-limiting example) with a decentralized identifier (DID) as part of a transaction that is being carried out with the verifier computing environment 104. The communications between the verifier computing environment 104 and the user device 101 (e.g., via wallet application 102) may be made using a trusted messaging protocol, such as DIDComm.

In this example, the user is providing the DID 111 to the verifier computing environment 104 to allow for the verifier computing environment 104 obtain confirmation that customer/holder of the DID 111 has sufficient currency within a transaction account to pay for a certain good or service. In order to make a query to a customer database service of the transaction account issuer or bank, the verifier would need to have an understanding of the schema, syntax, semantics, etc. being used by the database service. Without such knowledge, verification of the payment claim is problematic. Accordingly, in this example, the verifier computing environment 104 does not have knowledge of the semantics or syntax or schema of the transaction account issuer or bank.

As a result, the verifier computing environment 104 passes the DID 111 of the customer to the claims agent computing environment 108 with a query, as represented in sequence 2. In an illustrative example, the query may be asking if the holder/user of the DID 111 has sufficient funds to cover the price of a cup of coffee. The communications between the verifier computing environment 104 and the claims agent computing environment 108 may be made using a trusted messaging protocol, such as DIDComm.

In response to receiving the query and DID, the claims agent computing environment 108 performs large language model parsing on the query to identify attributes that can be converted into a machine-understandable representation of its meaning, as shown in sequence 3. For example, to process a received query or inquiry request regarding a credential or claim, the claims agent computer system 108 can execute a content parser 114 (FIG. 1) comprising a large language model (LLM) 117 that is configured to parse an unstructured claim request in order to return a structured response to the requester (e.g., verifier computing environment 104, user device 101, etc.). In certain embodiments, the unstructured claims may be expressed in a natural language form. The content parser 114 can be executed to extract, analyze and/or parse digital content into one or more terms. For example, the content parser 114 can comprise a semantic parser that is configured to convert a natural language phrase or utterance into a machine-understandable representation of its meaning.

Next, in order to respond to the claim query from the verifier computing environment 104 and verify whether the customer has the necessary funds, the claims agent computing environment 108 consults one or more customer records maintained by the transaction account issuer or bank in a private records system 300 (e.g., permissioned blockchain network) to verify whether the current funds for the customer will cover the cost of a cup of coffee, as shown in sequence 4.

In turn, the claims agent computing environment 108 can prepare and provide a verification response to the verifier computing environment 104 (e.g., Yes, the customer can pay for the cup of coffee), as represented in sequence 5. In various embodiments, the claims agent computing environment 108 can use a predictive model 115 to recognize the credential format of the verifiable credential and to interrogate the verifiable credential based on the query attributes to provide a structured response (e.g., Yes, the individual is over the age of 18).

Then, in sequence 6, the claims agent computing environment 108 can provide and send a verification response to the verifier computing environment (e.g., Yes, the holder of the verifiable credential is over the age of 18), as represented in sequence 6. The communications between the verifier computing environment 104 and the user device 101 (e.g., via wallet application 102) may be made using a trusted messaging protocol, such as DIDComm.

Accordingly, the verifier computing environment 104 can receive the response confirming the claim of the user and can complete or execute a transaction with the user device 101 based on the verification response, as shown in sequence 7.

Figure 4:
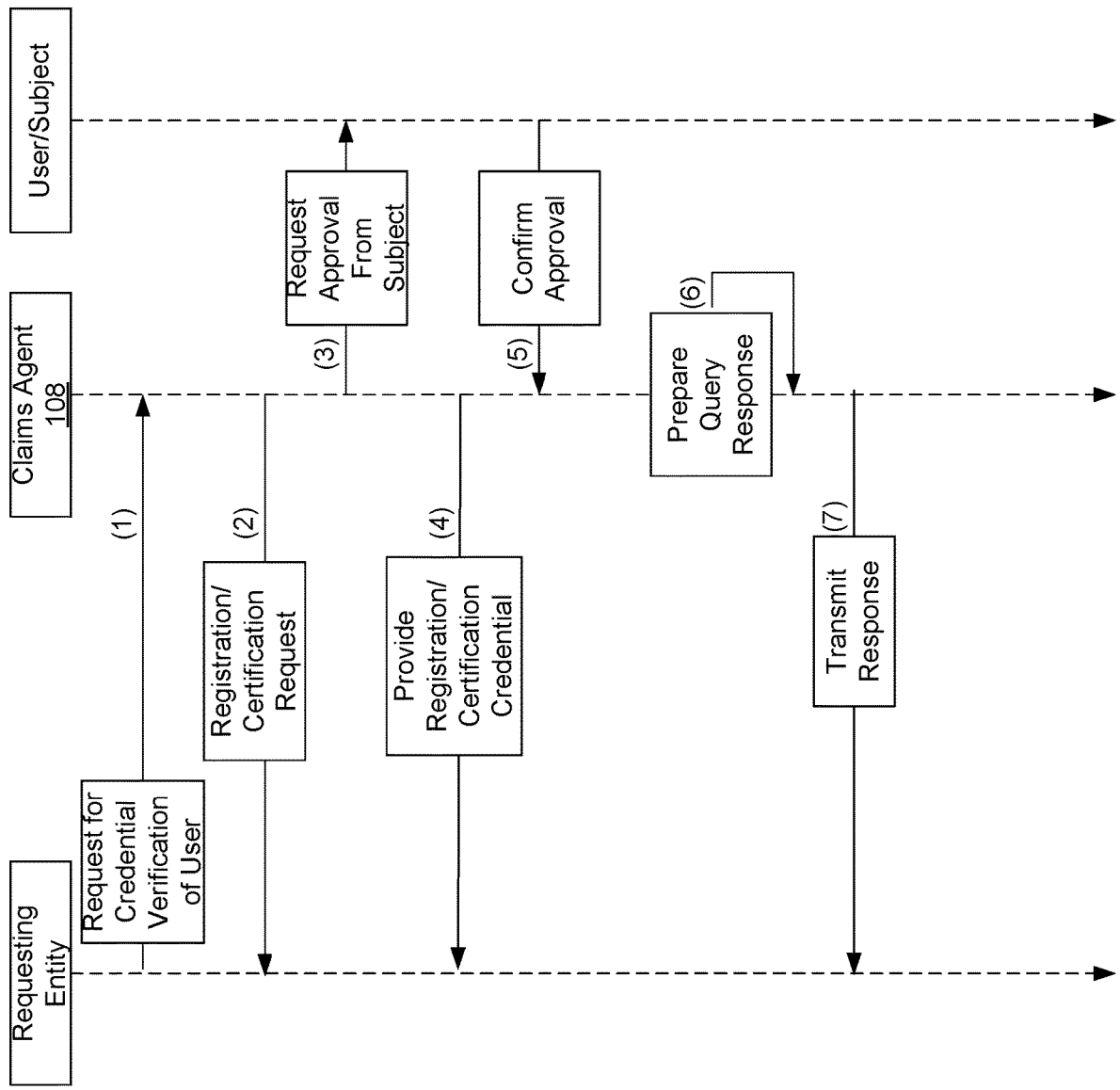

Referring now to FIG. 4, a flow or sequence diagram is provided that illustrates an execution of a process for authenticating a requesting user within a verifier interpretation system 100. As shown in sequence 1 of the diagram, a user device 101 (associated with a user) can request for verification of a credential belonging to another user, where the request is communicated to the claims computer system. Such a user device 101 can be associated with various types of users performing various types of roles. For example, in the example of FIG. 2, the requesting user was attempting to verify a verifiable credential of another user, and in the example of FIG. 3, the requesting user was a merchant that was attempting to verify that its customer could pay for a good/service. However, before providing such information to a requesting user, the claims agent computing environment 108 may need to verify that the requesting user (e.g., verifier computing environment 104) is trusted and/or authorized to receive the information.

Accordingly, in sequence 2 of the diagram, the claims agent computing environment 108 can ask for the requesting user to provide a registration credential showing that the user has pre-registered with or has been certified by the claims agent computing environment 108 (or some other trusted entity) as a trusted user/partner. For example, the requesting user may have previously created a user profile with the claims agent computing environment 108 as part of a registration process and can provide a previously registered credential (e.g., username and password) to verify registration with the claims agent computing environment 108, which allows the requesting user to make a query to a service 105 of the claims agent computing environment 108, such as those involving the content parser 114 and predictive model 115, from a user device 101 of the requesting user.

In certain embodiments, in addition to or in lieu of showing proof of registration, a subject of the request to the claims agent computing environment may need to approve of the release of any personal information to the requesting user, as represented in the sequence 3. For example, the claims agent computing environment 108 sends a message (e.g., via a trust spanning protocol, such as DIDComm), to the subject user to confirm that they accept or approve of the release of personal information to the requesting user. For instance, the claims agent computing environment 108 can send a message to the wallet 102 of the user device 101 of the subject user, where the claims agent computing environment 108 has the wallet address information for the subject user from their previous interactions, such as, but not limited to, the subject user being a customer, member, or employee of the claims agent computing system 108. Correspondingly, the subject user can confirm that they accept or approve of the release of the personal information by replying to the message sent by the claims agent computing environment (in sequence 5).

Upon receiving authorization or approval from the subject and/or proof/credential of registration or trust certification from the requesting user, the claims agent computing environment 108 can prepare a response to the requesting user that answers the requestor's verification request, as shown in sequence 6. In various embodiments, the claims agent computing environment 108 can use a predictive model 115 to recognize the credential format of the verifiable credential and to interrogate the verifiable credential based on the query attributes to provide a structured response.

Then, in sequence 7, the claims agent computing environment 108 can provide and send a response to the requesting entity. The communications between the claims agent computing environment 107 and a user device 101 of the requesting user (e.g., via wallet application 102) may be made using a trusted messaging protocol, such as DIDComm.

Referring back to FIG. 1, the verifier computing environment 104 and the claims agent computing environment 108 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the verifier computing environment 104 and the claims agent computing environment 108 can employ a plurality of computing devices that can be arranged in one or more server banks or computer banks or other arrangements. Such computing devices can be located in a single installation or can be distributed among many different geographical locations. For example, the verifier computing environment 104 and the claims agent computing environment 108 can include a plurality of computing devices that together can include a hosted computing resource, a grid computing resource or any other distributed computing arrangement. In some cases, the verifier computing environment 104 and the claims agent computing environment 108 can correspond to an elastic computing resource where the allotted capacity of processing, network, storage, or other computing-related resources can vary over time.

Also, the large language model 117 can represent any language model that includes a neural network with many parameters (tens of thousands, millions, or sometimes even billions or more) that is trained on large quantities of unlabeled text using self-supervised learning or semi-supervised learning techniques. Some large language models may be generative—that is they can generate new data based on patterns and structure learned from their input training data. Examples of large language models include various versions of OPENAI's Generative Pre-trained Transformer (GPT) model (e.g., GPT-1, GPT-2, GPT-3, GPT-4, etc.) META's Large Language Model Meta AI (LLaMA), and GOOGLE's Pathways Language Model 2 (PaLM 2), among others. A large language model 117 can be configured to return a response to a prompt, which can be in a structured form (e.g., a request or query with a predefined schema and/or parameters) or in an unstructured form (e.g., free form or unstructured text). For example, a prompt could be a query such as "What is the age of an individual?"

Additionally, the network 109 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 109 can also include a combination of two or more networks 109. Examples of networks 109 can include the Internet, intranets, extranets, virtual private networks (VPNs), and similar networks.

Figure 5:
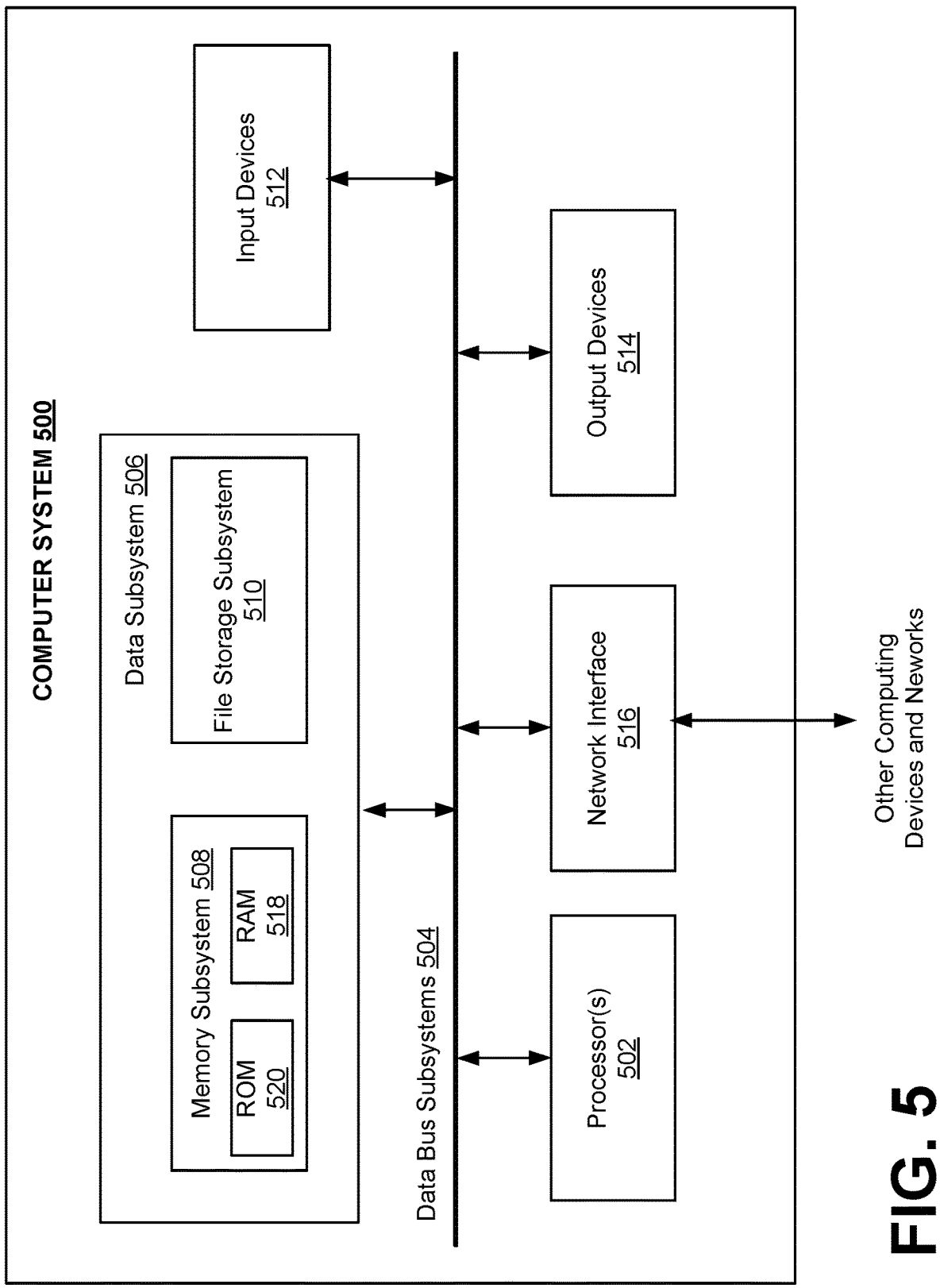
FIG. 5 is a block diagram of an example computer system that can be used to implement various embodiments of the present disclosure.

Referring now to FIG. 5, a block diagram of an example computer system 500 is depicted according to certain embodiments. Computer system 500 can be used to implement various computing devices of the verifiable credential management system, including user device 101, verifier computing environment 104, claims agent computing environment 108, etc. As shown in FIG. 5, computer system 500 includes one or more processors 502 that communicate with a number of peripheral devices via a data bus subsystem or interface 504. These peripheral devices include data subsystem 506 (comprising memory subsystem 508 and file storage subsystem 510), user interface input devices 512, user interface output devices 514, and network interface subsystem 516.

Data bus subsystem 504 can provide a mechanism that enables the various components and subsystems of computer system 500 to communicate with each other as intended. Although data bus subsystem 504 is shown schematically as a single bus, alternative embodiments of the data bus subsystem can utilize multiple busses.

Network interface subsystem 516 can serve as an interface for communicating data between computer system 500 and other computer systems or networks; e.g., nodes in a blockchain network. Embodiments of network interface subsystem 516 can include, e.g., an Ethernet card, a Wi-Fi and/or cellular adapter, digital subscriber line (DSL) units, and/or the like.

User interface input devices 512 can include a keyboard, pointing devices (e.g., mouse, trackball, touchpad, etc.), a touchscreen incorporated into a display, audio input devices (e.g., voice recognition systems, microphones, etc.) and other types of input devices. In general, use of the term "input device" is intended to include all possible types of devices and mechanisms for inputting information into computer system 500.

User interface output devices 514 can include a display subsystem, a printer, or non-visual displays such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computer system 500.

Data subsystem 506 includes memory subsystem 508 and file/disk storage subsystem 510 represent non-transitory computer-readable storage media that can store program code and/or data, which when executed by processor 502, can cause processor 502 to perform operations in accordance with embodiments of the present disclosure.

Memory subsystem 508 includes a number of memories including main random-access memory (RAM) 518 for storage of instructions and data during program execution and read-only memory (ROM) 520 in which fixed instructions are stored. File storage subsystem 510 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art. Memory can include both volatile and nonvolatile memory and data storage components.

In addition, a processor can represent multiple processors and/or multiple processor cores, and the one or more memory devices can represent multiple memories that operate in parallel processing circuits, respectively. In such a case, a local interface can be an appropriate network that facilitates communication between any two of the multiple processors or between any processor and any of the memory devices. The local interface can include additional systems designed to coordinate this communication, including, for example, performing load balancing. The processor can be electric or of some other available construction.

It should be appreciated that computer system 500 is illustrative and many other configurations having more or fewer components than system 500 are possible. These and other variations, modifications, additions, and improvements may fall within the scope of the appended claims(s). As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The components described herein can be embodied in the form of hardware, as software components that are executable by hardware, or as a combination of software and hardware. If embodied as hardware, the components described herein can be implemented as a circuit or state machine that employs any suitable hardware technology. This hardware technology can include one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random-access memory (RAM), read-only memory (ROM), hard drive, solid-state drive, USB flash drive, memory card, optical disc such as compact disc (CD) or digital versatile disc (DVD), floppy disk, magnetic tape, or other memory components.

The sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the sequence diagrams can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random-access memory (RAM) including static random-access memory (SRAM) and dynamic random-access memory (DRAM), or magnetic random-access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the principles of the disclosure. All such modifications and variations are intended to be included herein within the scope of this disclosure and protected by the following claims.

Therefore, the following is claimed:

1. A system, comprising:
a computing device comprising a processor and a memory; and
machine-readable instructions stored in the memory that, when executed by the processor, cause the computing device to at least:
receive an unstructured claim query for a data document from an entity computing device, wherein the data document is structured in accordance with a data document schema;
parse the unstructured claim query to identify attributes that are then converted to a machine-understandable representation of the unstructured claim query;
prepare, using a predictive model that is trained to understand data documents that are structured in accordance with the data document schema, a query response to the machine-understandable representation of the unstructured claim query by evaluating contents of the data document;
transmit the query response to the entity computing device;
receive feedback data from the entity computing device on an effectiveness or appropriateness of the query response; and
re-training the predictive model using the feedback data to provide an appropriate response.

2. The system of claim 1, wherein the query claim is parsed using a large language model.

3. The system of claim 1, wherein the data document comprises a verifiable credential.

4. The system of claim 1, wherein the machine-readable instructions further cause the computing device to receive a decentralized identifier from the entity computing device, wherein the data document is linked to the decentralized identifier.

5. The system of claim 4, wherein the machine-readable instructions further cause the computing device to retrieve the data document from a database using the decentralized identifier.

6. The system of claim 1, wherein the data document schema comprises an application programming interface schema.

7. The system of claim 1, wherein the data document schema comprises a web service schema.

8. The system of claim 1, wherein the machine-readable instructions further cause the computing device to verify that the entity computing device is a trusted device before responding to the claim query.

9. A method, comprising:
   receiving, by at least one computing device, an unstructured claim query for a data document from an entity computing device, wherein the data document is structured in accordance with a data document schema;
   parsing, by the at least one computing device, the unstructured claim query to identify attributes that are then converted to a machine-understandable representation of the unstructured claim query;
   preparing, by the at least one computing device using a predictive model that is trained to understand data documents that are structured in accordance with the data document schema, a query response to the machine-understandable representation of the unstructured claim query by evaluating contents of the data document;
   transmitting, by the at least one computing device, the query response to the entity computing device;
   receiving, by the at least one computing device, feedback data from the entity computing device on an effectiveness or appropriateness of the query response; and
   re-training, by the at least one computing device, the predictive model using the feedback data to provide an appropriate response.

10. The method of claim 9, wherein the query claim is parsed using a large language model.

11. The method of claim 9, wherein the data document comprises a verifiable credential.

12. The method of claim 9, further comprising receiving a decentralized identifier from the entity computing device, wherein the data document is linked to the decentralized identifier.

13. The method of claim 12, further comprising retrieving the data document from a database using the decentralized identifier.

14. The method of claim 13, wherein the data document schema comprises an application programming interface schema.

15. The method of claim 13, wherein the data document schema comprises a web service schema.

16. The method of claim 9, further comprising verifying that the entity computing device is a trusted device before responding to the claim query.

17. A non-transitory, computer-readable medium comprising machine-readable instructions that, when executed by a processor of a computing device, cause the computing device to at least:
   receive an unstructured claim query for a data document from an entity computing device, wherein the data document is structured in accordance with a data document schema;
   receive a decentralized identifier from the entity computing device, wherein the data document is linked to the decentralized identifier;
   parse the unstructured claim query to identify attributes that are then converted to a machine-understandable representation of the unstructured claim query;
   retrieve the data document from a database using the decentralized identifier;
   prepare, using a predictive model that is trained to understand data documents that are structured in accordance with the data document schema, a query response to the machine-understandable representation of the unstructured claim query by evaluating contents of the data document;
   transmit the query response to the entity computing device;
   receive feedback data from the entity computing device on an effectiveness or appropriateness of the query response; and
   re-train the predictive model using the feedback data to provide an appropriate response.

18. The non-transitory, computer-readable medium of claim 17, wherein the data document schema comprises a verifiable credential schema, an application programming interface schema, or a web service schema.

19. The non-transitory, computer-readable medium of claim 17, wherein the machine-readable instructions further cause the computing device to at least verify that the entity computing device is a trusted device before responding to the claim query.

* * * * *